United States Patent
Fang et al.

(10) Patent No.: US 12,007,013 B2
(45) Date of Patent: Jun. 11, 2024

(54) GEAR-BASED MECHANICAL METAMATERIALS WITH CONTINUOUSLY ADJUSTABLE ELASTIC PARAMETERS IN LARGE RANGE

(71) Applicant: NATIONAL UNIVERSITY OF DEFENSE TECHNOLOGY, Hunan (CN)

(72) Inventors: Xin Fang, Hunan (CN); Jihong Wen, Hunan (CN); Dianlong Yu, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 92 days.

(21) Appl. No.: 17/759,098

(22) PCT Filed: Nov. 5, 2021

(86) PCT No.: PCT/CN2021/129010
§ 371 (c)(1),
(2) Date: Jul. 19, 2022

(87) PCT Pub. No.: WO2022/095962
PCT Pub. Date: May 12, 2022

(65) Prior Publication Data
US 2023/0044653 A1    Feb. 9, 2023

(30) Foreign Application Priority Data
Nov. 5, 2020 (CN) .......................... 202011220745.0

(51) Int. Cl.
*F16H 57/00* (2012.01)
*F16H 1/22* (2006.01)
(Continued)

(52) U.S. Cl.
CPC .......... *F16H 57/0018* (2013.01); *F16H 1/22* (2013.01); *F16H 1/28* (2013.01); *F16H 55/17* (2013.01);
(Continued)

(58) Field of Classification Search
CPC .......... F16H 57/0018; F16H 1/22; F16H 1/28; F16H 55/17; F16H 2057/0056; G06F 30/17; G06F 2119/06
See application file for complete search history.

(56) References Cited

U.S. PATENT DOCUMENTS

2018/0047259 A1* 2/2018 Carter ...................... G08B 6/00

* cited by examiner

*Primary Examiner* — Terence Boes
(74) *Attorney, Agent, or Firm* — Chiesa Shahinian & Giantomasi PC (57) ABSTRACT

A gear-based mechanical metamaterial with continuously adjustable elastic parameters in a large range is provided. The gear-based mechanical metamaterial includes a gear array, a frame and connecting shafts. The gear array is formed by periodically extending mechanical metamaterial cells along an x direction and a y direction. Each of the mechanical metamaterial cells is formed by arranging a multiple gears. Adjacent gears of the multiple gears are meshed with each other. Each of the multiple gears includes a center hole and two centrosymmetric irregularly-shaped holes. A thickness of an elastic arm between the each of two centrosymmetric irregularly-shaped holes and an outer wall of a corresponding one of the multiple gears is uniformly increased or decreased. Each of the connecting shafts is arranged in a center hole of a corresponding one of the multiple gears.

18 Claims, 11 Drawing Sheets

(51) Int. Cl.
  *F16H 1/28* (2006.01)
  *F16H 55/17* (2006.01)
  *G06F 30/17* (2020.01)
  *G06F 119/06* (2020.01)
(52) U.S. Cl.
  CPC ...... *G06F 30/17* (2020.01); *F16H 2057/0056* (2013.01); *G06F 2119/06* (2020.01)

GEAR-BASED MECHANICAL METAMATERIALS WITH CONTINUOUSLY ADJUSTABLE ELASTIC PARAMETERS IN LARGE RANGE

CROSS-REFERENCE TO RELATED APPLICATIONS

This application is a national stage under 35 U.S.C. 371 of International Patent Application No. PCT/CN2021/129010, filed Nov. 5, 2021, which claims priority to Chinese Patent Application No. 202011220745.0, filed Nov. 5, 2020, the disclosures of all are incorporated herein by reference in their entirety.

TECHNICAL FIELD

The present disclosure relates to the fields of mechanics and mechanical engineering, in particular to gear-based mechanical metamaterials with continuously adjustable elastic parameters in a large range.

BACKGROUND ART

Currently, the fourth industrial revolution has already come, and the cores of the fourth industrial revolution are intelligent/smart structures and equipment, such as adaptive aircrafts, adaptive control systems, intelligent connectors and intelligent vibration noise control devices. The smart equipment requires its units and materials to be intelligently adjustable. The mechanical material with adjustable elastic characteristics (including Young modulus, shear modulus and deformation mode) can support the design and preparation of intelligent equipment. However, conventional piezoelectric materials and shape memory alloy materials can hardly present wide-range tunability. A number of challenges exist in the new intelligent material design.

Mechanical metamaterials are artificial composite with unusual mechanical properties, and can generate the properties of low density, high modulus, negative Poisson's ratio, chirality, etc. The typical structures include a two-dimensional honeycomb structure, a three-dimensional lattice structure, a folding structure and a chiral structure. The mechanical metamaterial provides an important structural design strategy for industrial systems such as aerospace, ships, high-speed rails and automobiles. The reconfigurable mechanical metamaterial refers to a mechanical metamaterial capable of changing the geometric shape under external stimulations (such as compressive force). Changes in geometry (shape morphing) can lead to intrinsic changes in mechanical properties, for example, elastic modulus, shear modulus, deformation mode, damping, and anisotropy abruptly changing from one value to another. Perfect tunability of the elastic properties requires not only a large tunable range, but also dense stable tunable states. However, currently designed reconfigurable mechanical metamaterial can only offer very few stable reconfigurable states. Thus, it is difficult to realize practical intelligent materials with great engineering significance. A new design solution is needed for the large-range and continuous tunable intelligent material design.

SUMMARY

The present disclosure provides gear-based mechanical metamaterials with continuously adjustable elastic parameters in a large range, which is designed to overcome the defects in the existing reconfigurable mechanical metamaterials that have narrow adjusting range, few stable states and low controlling robustness.

To achieve the purpose, the present disclosure provides gear-based mechanical metamaterials with continuously adjustable elastic parameters in a large range. The gear-based mechanical metamaterial includes a gear array, a frame and connecting shafts. The gear array is formed by periodically extending mechanical metamaterial cells along an x direction and a y direction. Each of the mechanical metamaterial cells is formed by arranging a multiple gears. Adjacent gears of the multiple gears are meshed with each other. Each of the multiple gears includes a center hole and two centrosymmetric irregularly-shaped holes. A thickness of a elastic arm between each of the two centrosymmetric irregularly-shaped holes and an outer wall of a corresponding one of the multiple gears is uniformly increased or decreased. Each of the connecting shafts is arranged in a center hole of a corresponding one of the multiple gears. The gear array is connected to the frame through the connecting shafts.

Further, a meshing mode of every two adjacent gears of the multiple gears may include a positive-polarity meshing mode and a negative-polarity meshing mode. The positive-polarity meshing mode may be such a mode that the thickness of the elastic arm, which may be at a meshing point of the every two adjacent gears, of one of the every two adjacent gears may be gradually increased, and the thicknesses of the elastic arm, which may be at the meshing point of the every two adjacent gears, of an other one of the every two adjacent gears is gradually decreased. The negative-polarity meshing mode may be such a mode that the thicknesses of the elastic arm of the one of the every two adjacent gears and the thickness of the elastic arm of the other one of the every two adjacent gears may be simultaneously increased or decreased.

Further, the two centrosymmetric irregularly-shaped holes in each of the multiple gears may be spaced apart through elastic arm beams, which may be on a same horizontal line, of the corresponding one of the multiple gears. There may be an angle difference may be between the cantilever beams of one of the every two adjacent gears which may be meshed with each other and the cantilever beams of another one of the every two adjacent gears. The angle difference may vary from 0 degree to 180 degrees.

Further, stiffness of the frame may be smaller than minimum stiffness formed by meshing the multiple gears.

Further, the frame is an elastic frame which may be formed by periodically extending thin-wall circular rings. A thick-wall circular ring with a through hole may be arranged at a connecting point of every two adjacent thin-wall circular rings of the thin-wall circular rings. The through hole of the thick-wall circular ring may be sleeved on a corresponding one of the connecting shafts. The thick-wall circular ring may be connected with a respective one of the plurality of gears through the corresponding one of the connecting shafts.

Further, each of the mechanical metamaterial cells may include four gears meshed with one another. The four gears may be arranged into a 2 multiply 2 array. The structure can serve as a gear-based mechanical metamaterial for adjusting and controlling Young modulus, damping and anisotropic parameters.

Further, the every two adjacent gears may be connected in the positive-polarity meshing mode or the negative-polarity meshing mode. Every two gears spaced apart by one gear may have same installation angles, same installation front faces and same installation back faces (the same gear has a front face and a back face).

Further, each of the mechanical metamaterial cells may include seven gears which are meshed with one another. The seven gears may be arranged into a 3 multiply 3 array. Two side sites of a middle row or a middle column may be vacated one gear of the gears respectively to form a defect state. Interspaces formed by two adjacent gears among every three gears arranged diagonally of the seven gears is provided with respective imbedded components which are in conformal and coordinated contact with the three gears. The structure may form a gear-based mechanical metamaterial for adjusting and controlling shear modulus.

Further, each of the imbedded components may be a cross-shaped imbedded component, and each of four end parts of the cross-shaped imbedded component may be a concave arc matched with an arc of a corresponding one of the seven gears. Two symmetrical elastic arms may extend outwards from each of the four end parts of the cross-shaped imbedded component.

Further, every two adjacent gears of the seven gears may be meshed in the negative-polarity meshing mode.

The embodiments have the following beneficial effects.

Firstly, the present disclosure provides a gear-based mechanical metamaterial with continuously adjustable elastic parameters in a large range. The gear-based mechanical metamaterial includes a gear array, a frame and connecting shafts. The gear array is formed by periodically extending mechanical metamaterial cells along an x direction and a y direction. Each of the mechanical metamaterial cells is formed by arranging a multiple gears. Adjacent gears of the multiple gears are meshed with each other. The arrangement of gears in the cell depends on the elastic parameter to be adjusted and controlled. Every gear includes a center hole and two centrosymmetric irregularly-shaped holes. A thickness of a elastic arm between each of the two centrosymmetric irregularly-shaped holes and an outer wall gear is uniformly increased or decreased. The connecting shaft is put into the center hole of a gear. The gear array is connected to the frame through the connecting shafts. All gears in the metamaterial can be rotated by rotating any one gear in the metamaterial. When a compressive load is applied to the gear, the contact between gear teeth will transfer the load to the elastic arm of the gear, and leads to the bending deformation of the elastic arm. The stiffness of the deformation is closely related to the thicknesses of elastic arms at both sides of the meshing point. As the thickness of the elastic arm on each gear is smoothly changed (namely uniformly changed), the deformation stiffness can be adjusted by rotating the gears, so that the tunable Young modulus, shear modulus, damping, anisotropy and non-anisotropy are realized. All gears in the metamaterial can be rotated by rotating any one gear in the metamaterial, so that the thicknesses of the elastic arm at the meshing point are changed, and thus the smooth (namely uniform) and continuous adjustment and control of the elastic parameters of the mechanical metamaterial is realized.

Secondly, the present disclosure provides a gear-based mechanical metamaterial with continuously adjustable elastic parameters in a large range. A meshing mode of every two adjacent gears includes a positive-polarity meshing mode and a negative-polarity meshing mode. The positive-polarity meshing mode is such a mode that the thickness of the cantilever, which is at a meshing point of the every two adjacent gears, of one of the every two adjacent gears is gradually increased, and the thicknesses of the cantilever, which is at the meshing point of the every two adjacent gears, of another one of the every two adjacent gears is gradually decreased. The negative-polarity meshing mode is such a mode that the thicknesses of the cantilever of the one of the every two adjacent gears and the thickness of the cantilever of the other one of the every two adjacent gears are simultaneously increased or decreased. The two centrosymmetric irregularly-shaped holes in each of the plurality of gears are spaced apart through elastic arm beams, which are on a same horizontal line, of the corresponding one of the plurality of gears. An angle difference is between the elastic arm beams of one of the every two adjacent gears which are meshed with each other and the elastic arm beams of another one of the every two adjacent gears. The angle difference ranges from 0 degree to 180 degrees. The adjustment ranges, and the changing curves of parameters in the rotation process can be controlled by changing the meshing mode and the angle difference between the gears.

Thirdly, according to the gear-based mechanical metamaterial with continuously adjustable elastic parameters in a large range provided by the present disclosure, the large-range continuous adjustment of Young modulus, shear modulus and damping is realized by using the porous structure of the gear. When adjusting and controlling the Young modulus, the gears are in close fit, and each internal gear is meshed with four adjacent gears. The parameters that are Young modulus, damping and anisotropy can be adjusted synchronously. The damping of the mechanical metamaterial is generated by slippage between gear teeth. The damping effect increases along with the Young modulus, thereby achieving the characteristics of high stiffness and high damping. When the shear modulus and nonreciprocity are adjusted, a cavity is reserved at intervals of one gear in the gear array, so that some of the gears are only meshed with two adjacent gears. Moreover, a component is imbedded into the interspace formed by three meshing gears. The structure for adjusting the shear modulus can also realize synchronous adjustment and control of the Young modulus.

Fourthly, according to the gear-based mechanical metamaterial provided by the present disclosure, gear meshing and rotation are directly applied to realize large-range and continuous tunability of Young modulus, shear modulus, damping, anisotropy and non-anisotropy, so that high structural reliability and robustness of operation are realized. Meanwhile, high stiffness, high strength and high damping are realized. The realizability is high, and it's easy to manufact these metamaterials.

In addition to those described objects, features and advantages, the present disclosure has other objects, features and advantages. The following describes the present disclosure in detail with reference to the drawings.

BRIEF DESCRIPTION OF THE DRAWINGS

To illustrate the technical solutions in the embodiments of the present disclosure more clearly, the drawings required in the embodiments or the prior art will be briefly described below. Apparently, the drawings in the following description show merely some embodiments of the present disclosure, and a person of ordinary skill in the art may obtain other drawings according to these drawings without creative efforts. In the drawings.

List of the reference characters: 100 gear; 101 center hole; 102 irregularly-shaped hole; 103 elastic arm; 104 elastic arm beam; 200 connecting shaft; 300 frame; 301 thin-wall circular ring; 302 thick-wall circular ring; 400 cross-shaped imbedded component; 401 concave arc; and 402 elastic arm.

DETAILED DESCRIPTION OF THE EMBODIMENTS

The technical solutions in the embodiments of the present disclosure will be clearly and completely described below with reference to the drawings in the embodiments of the present disclosure. Apparently, the described embodiments are merely a part rather than all of the embodiments of the present disclosure. Based on the embodiment in the present disclosure, all other embodiments obtained by those skilled in the art under the premise of without contributing creative labor belong to the scope protected by the present disclosure.

Figure 1A:
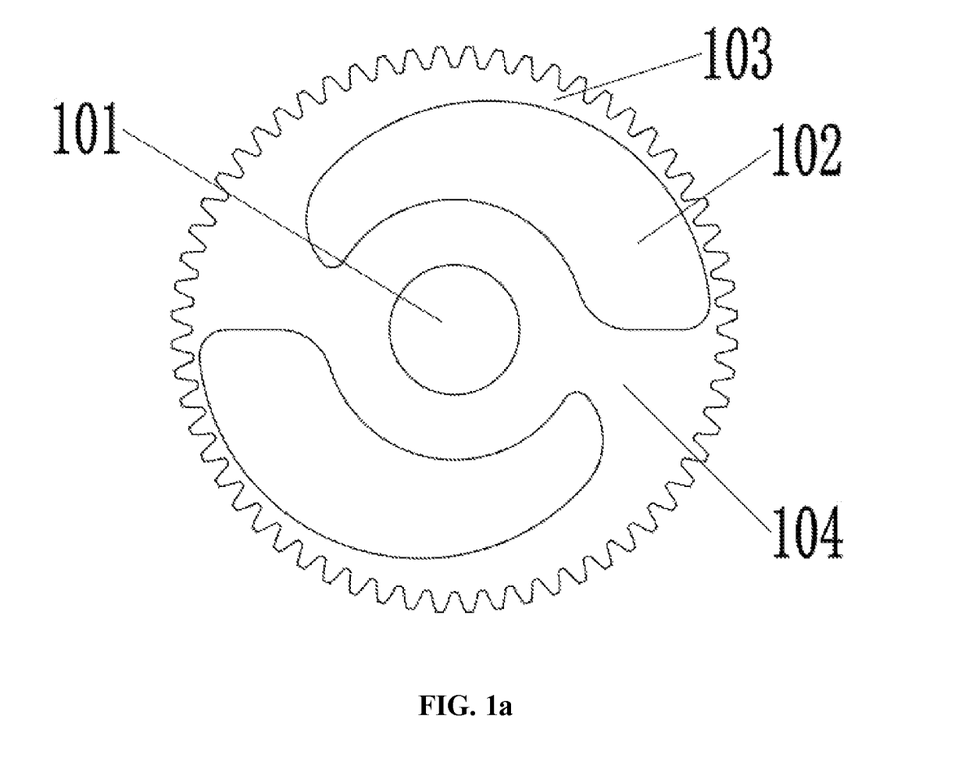
FIG. 1a is a top view of a single gear in preferred embodiments of the present disclosure, where irregularly-shaped holes in the gear are in shapes similar to a Taiji (or supreme ultimate) pattern, and the gear is called a Taiji gear for short.
Figure 1B:
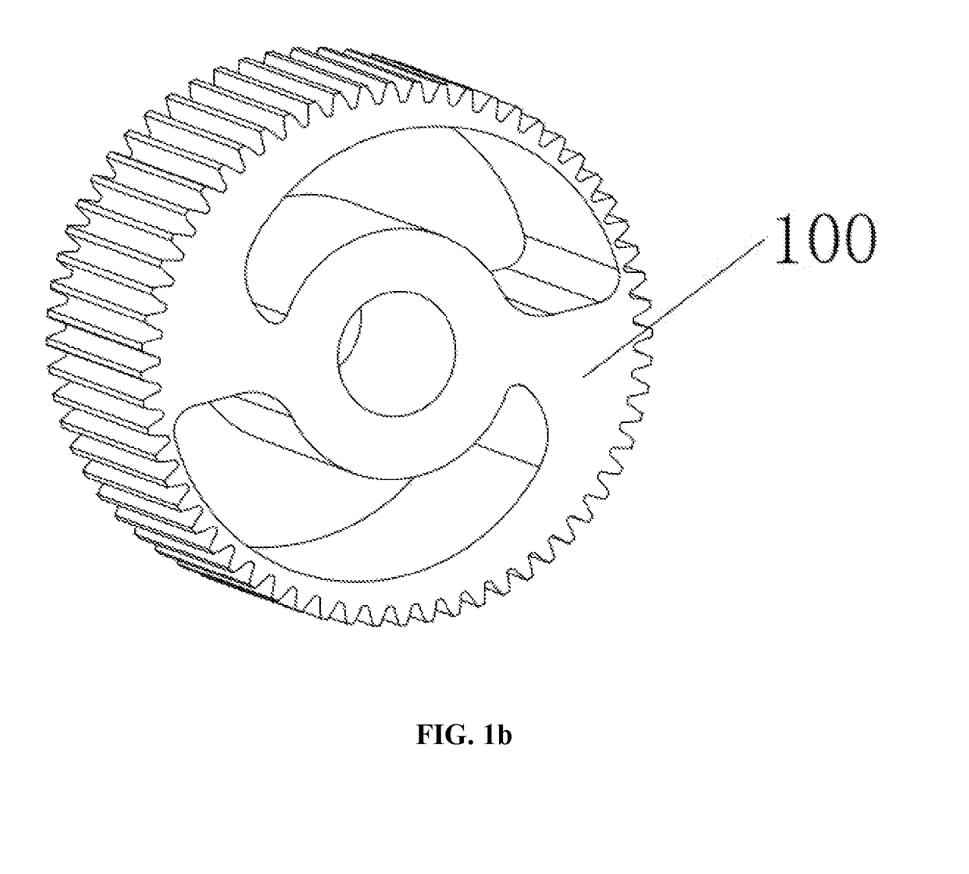
FIG. 1b is a stereoscopic structural diagram of the single gear in preferred embodiments of the present disclosure.

The basic unit of the gear-based mechanical metamaterial proposed by the present disclosure is a single porous gear, preferably, designed with a spur gear, as shown in FIG. 1a and FIG. 1b (where, FIG. 1a is a top view of a single gear in preferred embodiments of the present disclosure and FIG. 1b is a stereoscopic structural diagram of a single gear in preferred embodiments of the present disclosure). The gear 100 is internally provided with centrosymmetric hole structures, and preferably, the gear 100 includes a center hole 101 and two centrosymmetric irregularly-shaped holes 102. Preferably, the shapes of the irregularly-shaped holes are similar to a Taiji pattern, and the gear can be called a Taiji gear for short. Each of two centrosymmetric elastic arms 103 is formed between an irregularly-shaped holes 102 and an outer wall of the gear. The thickness of each elastic arm 103 is uniformly increased or decreased (namely smoothly changed) when changing the rotation angle. By specifying the gear module, the influence of the gear teeth on the bending stiffness of the elastic arm 103 can be reduced by increasing the number of the gear teeth. Preferably, the graphic spiral directions of both the front face and the back face of the Taiji-shape gear are opposite.

The gear-based mechanical metamaterial with continuously adjustable elastic parameters in a large range includes a gear array, a frame 300 and connecting shafts 200. The gear array is formed by periodically extending mechanical metamaterial cells along an x direction and a y direction. Each cell is formed by arranging multiple gears 100. The arrangement mode of the gears 100 depends on the elastic parameters to be adjusted and controlled. Adjacent gears are meshed with each other. The gear 100 includes a center hole 101 and two centrosymmetric irregularly-shaped holes 102. The thickness of each elastic arm 103 between an irregularly-shaped holes 102 and an outer wall of the corresponding one of the gears is uniformly increased or decreased. The connecting shaft 200 is arranged in the center hole 101 of the corresponding one of the gears. The gear array is connected with the frame 300 through the connecting shafts 200.

All gears in the metamaterial can be rotated by rotating any one gear in the metamaterial. When a compressive load is applied to the gear, the contact of the gear teeth will transfer the load to the gear elastic arm 103 and cause bending deformation on the elastic arm 103. The deformation stiffness is closely related to the thicknesses of the elastic arm 103 at both sides of the meshing point. As the thicknesses of the elastic arm 103 on each gear is smoothly changed, the deformation stiffness can be adjusted by rotating the gears, so that changing Young modulus, shear modulus, damping, anisotropy and non-anisotropy are realized. All gears in the metamaterial can be rotated by rotating any one gear in the metamaterial, so that the thicknesses of the elastic arm 103 at the meshing point are changed, and smooth and continuous adjustment and control of the elastic parameters of the mechanical metamaterial are realized.

The value of the anisotropy parameter is defined as the ratio of the Young modulus in the x direction to the Young modulus in the y direction when the rotation angle θ is given, namely $E_x/E_y$. The value of the non-anisotropy parameter is defined as the ratio of the shear deformation generated by applying the positive shear stress $\tau^+$ to the shear deformation generated by applying the negative shear stress $\tau^-$ when the rotation angle θ and the shear stress τ are given.

Figure 2:
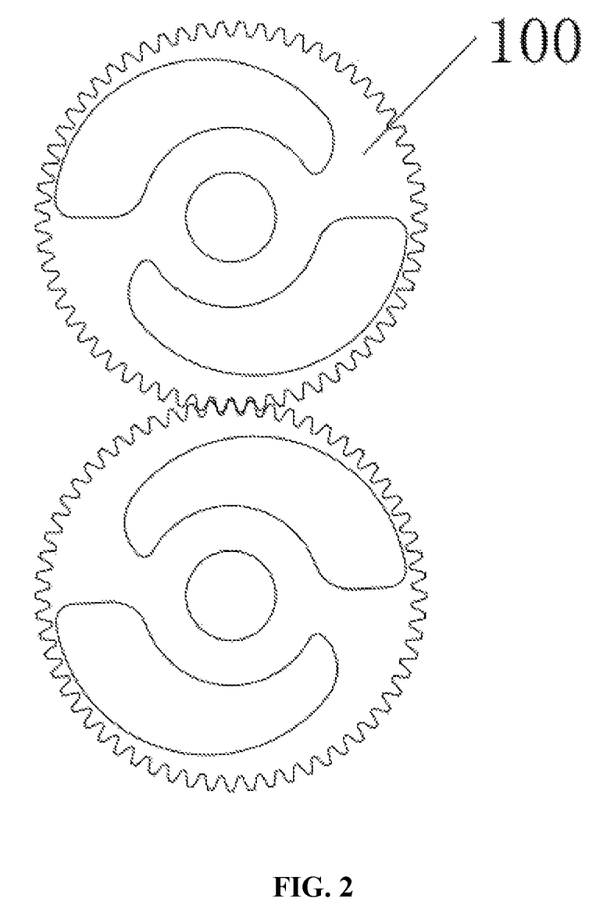
FIG. 2 is a schematic diagram of a positive-polarity meshing mode of two gears in preferred embodiments of the present disclosure, where an angle difference between the two gears is 3 degrees.
Figure 3:
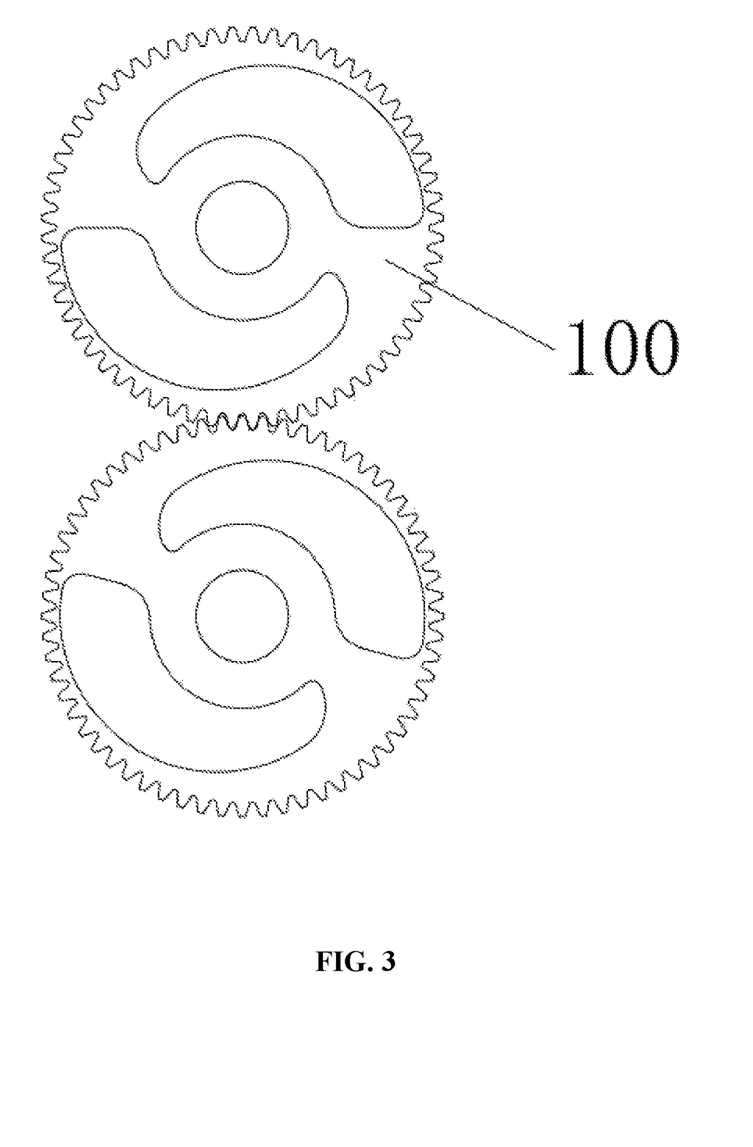
FIG. 3 is a schematic diagram of a negative-polarity meshing mode of two gears in preferred embodiments of the present disclosure, where an angle difference between the two gears is 15 degrees.

A meshing mode of every two adjacent gears includes a positive-polarity meshing mode and a negative-polarity meshing mode. When one of the thicknesses of the elastic arm 103 at a meshing point of the every two adjacent gears is gradually increased and the other one of the thicknesses of the elastic arm is gradually decreased (namely, the graphic spiral directions of the two gears in the shapes of a Taiji pattern are opposite), the meshing mode of the every two adjacent gears is the positive-polarity meshing mode. When the thicknesses of the elastic arm 103 at the meshing point of the every two adjacent gears are simultaneously increased or decreased (namely, the graphic spiral directions of the two gears in the shapes of a Taiji pattern are the same), the meshing mode of the every two adjacent gears is the negative-polarity meshing mode. As shown in FIG. 2, when the graphic spiral directions of the two gears are opposite, the meshing mode is called as positive-polarity meshing. As shown in FIG. 3, when the graphic spiral directions of the two gears are the same, the meshing mode is called as negative-polarity meshing. The two centrosymmetric irregularly-shaped holes 102 in each of the multiple gears are spaced apart through elastic arm beams 104, which are on the same horizontal line. An angle difference is formed between the elastic arm beams 104 of two meshing gears. The angle varies from 0 degree to 180 degrees. For example, the angle differences between the local coordinates of the two gears shown in FIG. 2 and FIG. 3 are 3 degrees and 15 degrees, respectively. Through gear transmission, all other gears can be rotated by rotating any one gear in the mechanical metamaterial. The rotation angles of the two meshing gears are opposite, which are θ and −θ.

The stiffness of the frame 300 is smaller than the minimum stiffness formed by gear meshing. In a specific embodiment, the frame 300 is an elastic frame. The elastic frame is formed by periodically extending thin-wall circular rings 301. A thick-wall circular ring 302 with a through hole is arranged at a connecting point of every two adjacent thin-wall circular rings of the thin-wall circular rings 301. The through hole of the thick-wall circular ring 302 is sleeved on a corresponding one of the connecting shafts 200. The joints of two transversely adjacent thin-wall circular rings of the thin-wall circular rings 301 are welded together. The two faces of the gear array are connected with the elastic frame through connecting shafts 200. All the gears are connected into a whole through the connecting shafts 200 and the elastic frame.

When a compressive load is applied to the gear, the contact of the gear teeth will transfer the load to the gear elastic arm and leads to bending deformation on the elastic arms. The stiffness $k_{arm}$ of a single elastic arm is defined as the ratio of an radial force to the deformation of the elastic arm when applying a radial force between the center hole of the gear and a point on the elastic arm, so $k_{arm}$ is closely related to the thickness of the elastic arm. The thickness of the elastic arm changes smoothly along with change of the rotation angle θ, so that $k_{arm}(\theta)$ is a smooth function. The entire stiffness formed by a pair of meshing elastic arm is $K_{arm}=k_{arm1}k_{arm2}/(k_{arm1}+k_{arm2})$, where $k_{arm1}$ and $k_{arm2}$ are the stiffness of the two elastic arm at both sides of the meshing point respectively. Thus, $K_{arm}(\theta)$ is also a smooth function. It is defined that $K_p=K_{arm}(\theta)$ when the applied load is large enough so that nonlinear contact effect is no longer significant. The equivalent Young modulus of the gear-based mechanical metamaterial in the y direction is $E_y=K_p/B+E_f$. Where B is the width of the gear, and $E_f$ is the equivalent Young modulus of the frame connected to gears. The damping coefficient η is positively correlated with $E_y$. The relationship between the Young modulus $E_x$ in the x direction and the Young modulus $E_y$ in the y direction is $E_x(\theta)=E_y(\theta+90°)$. The value of the anisotropy parameter is defined as $E_x/E_y$. According to the theories, $K_{arm}(\theta)$ can be adjusted by changing the rotation angle of the gear to tune Young modulus, damping and anisotropy. As $k_{arm1}$ and the $k_{arm2}$ depend on the meshing polarity (positive or negative mode) and the angle difference β of the two gears, the tunable range and the changing curve when changing the rotation process can be controlled by changing the meshing polarity and the angle difference.

Figure 4:
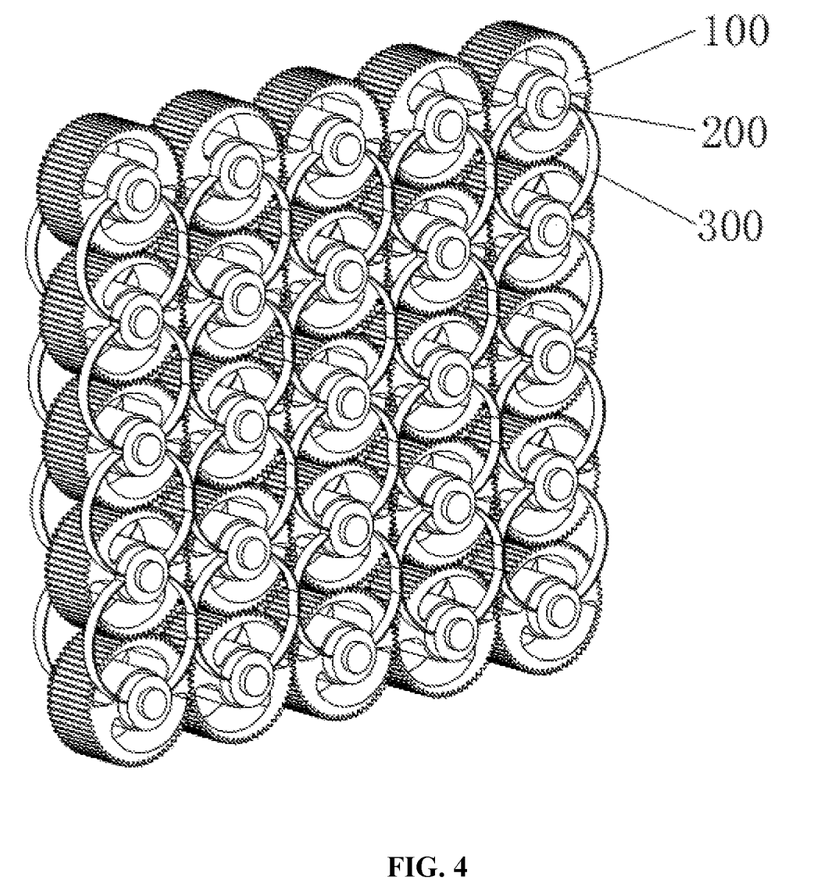
FIG. 4 is a structural diagram of a gear-based mechanical metamaterial for adjusting and controlling the parameters such as Young modulus, damping and anisotropy in preferred embodiments of the present disclosure, where the gear-based mechanical metamaterial is composed of 5*5 gears in the positive-polarity meshing mode, and an angle difference is 3 degrees.
Figure 5:
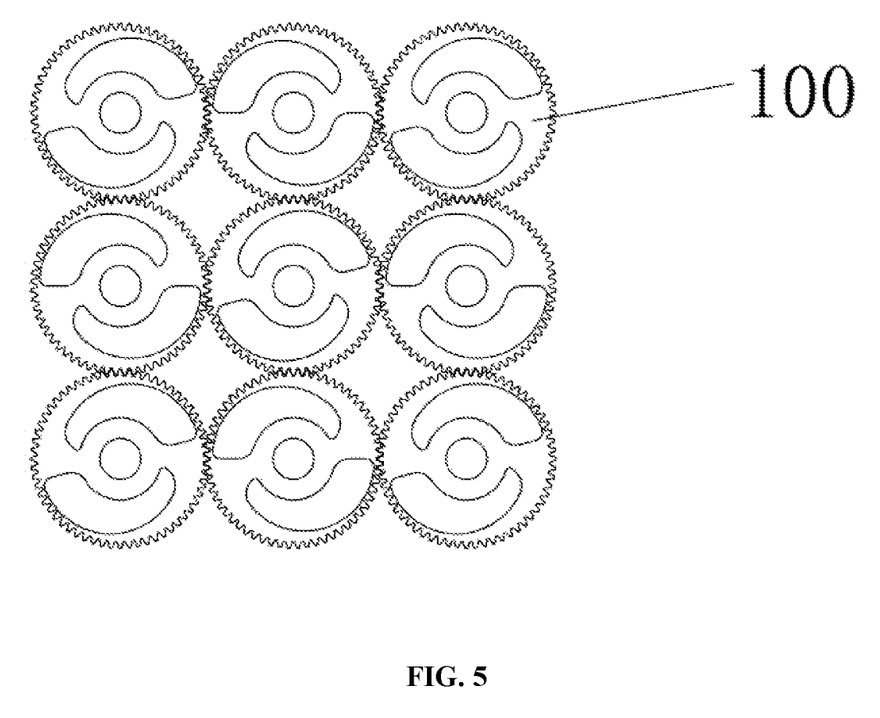
FIG. 5 is a schematic diagram of the arrangement mode of the gears in an x direction and a y direction.

In a specific embodiment, as shown in FIG. 4, the gear-based mechanical metamaterial for adjusting Young modulus, damping and anisotropy includes a gear array, a frame and connecting shafts. The gear array is formed by periodically extending mechanical metamaterial cells along the x direction and the y direction. Each mechanical metamaterial cell is composed of four gears meshed with one another. The four gears are arranged in a 2 multiply 2 array mode. The gears in the gear array are in close fit. Each internal gear is meshed with four adjacent gears. Every two adjacent gears are connected according to the positive-polarity meshing mode or the negative-polarity meshing mode. The angle differences of the two adjacent gears (along the x direction and along the y direction) are the same. A gear has a front face and a back face. Two adjacent gears have the identical face (front or back) when they are installed. In order to keep the polarity and the angle difference between adjacent gears of the whole metamaterial consistent, the install way of a gear at intervals of two gears in the layout of the gear array, as shown in FIG. 5. That is, the mounting polarity and the mounting angle these gears at intervals of one gear in the horizontal direction (or in the vertical direction) in the gear array are the same.

Figure 6:
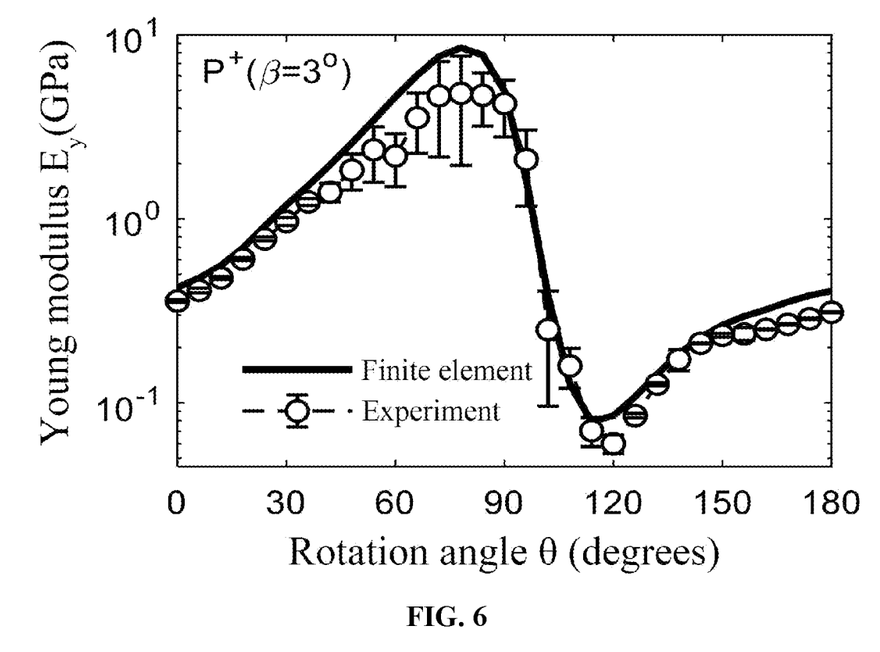
FIG. 6 is a changing curve diagram of a Young modulus $E_y$ in the y direction along with change of a rotation angle θ of the gear in preferred embodiments of the present disclosure; where in the figure, the label $P^+(\beta=3°)$ indicates that the gears in the mechanical metamaterial are meshed in the positive-polarity meshing mode, and an angle difference is 3 degrees.
Figure 7:
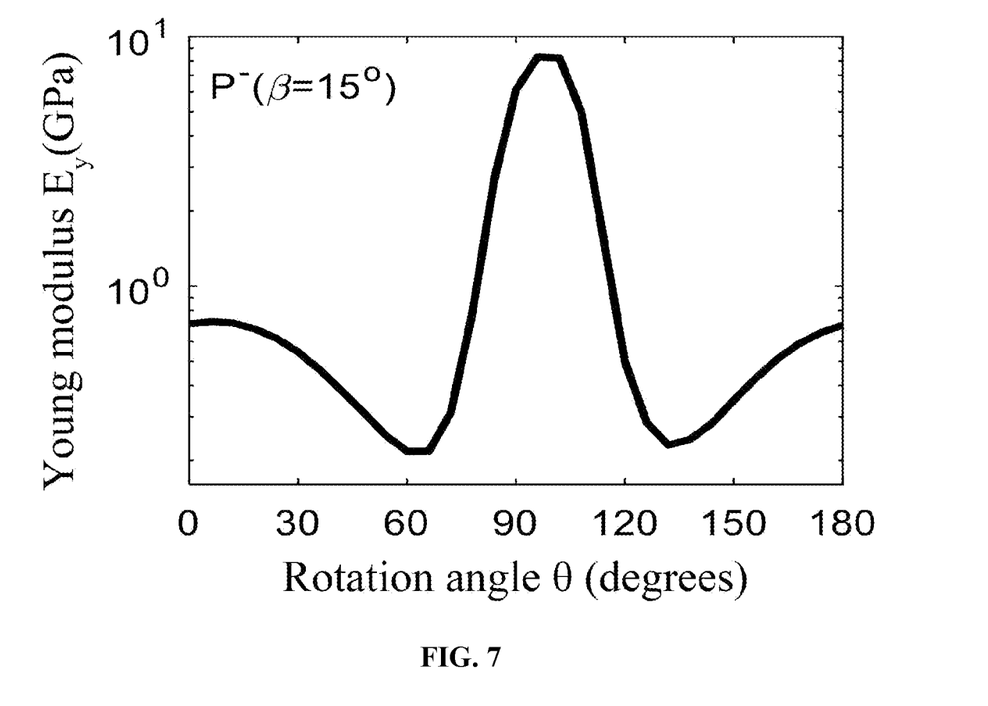
FIG. 7 is a changing curve diagram of the Young modulus $E_y$ in the y direction along with change of the rotation angle θ of the gear through calculation of a finite element simulation method in preferred embodiments; where in the figure, the label) $P^-(\beta=3°)$ indicates that the gears in the mechanical metamaterial are meshed in the positive-polarity meshing mode, and an angle difference is 15 degrees.

The present disclosure provides the tunable characteristic of the equivalent Young modulus of the gear-based mechanical metamaterial in theory and experiment. FIG. 6 shows the tunable curve of the Young modulus of the mechanical metamaterial varying along with the rotation angle θ. Here, this mechanical metamaterial has positive meshing mode and the angle difference between adjacent gears β is 3 degrees. The Young modulus of the mechanical metamaterial in a single direction can be smoothly and continuously adjusted and controlled by 80 times. FIG. 7 shows the tunable curve of the Young modulus of the mechanical metamaterial with negative meshing mode and the angle difference between adjacent gears β is 15 degrees. Its Young modulus can be smoothly and continuously adjusted and controlled by 38 times. In addition, due to the fact that the 90-degree phase difference, which is denoted by $E_x(\theta)=E_y(\theta+90°)$, exists between the Young modulus in the x direction and the Young modulus in the y direction, $E_x$ and $E_y$ change synchronously. So, the value of the anisotropy parameter $E_x/E_y$ changes with the rotation angle θ of the gear, and the tunable anisotropy is achieved.

Figure 8:
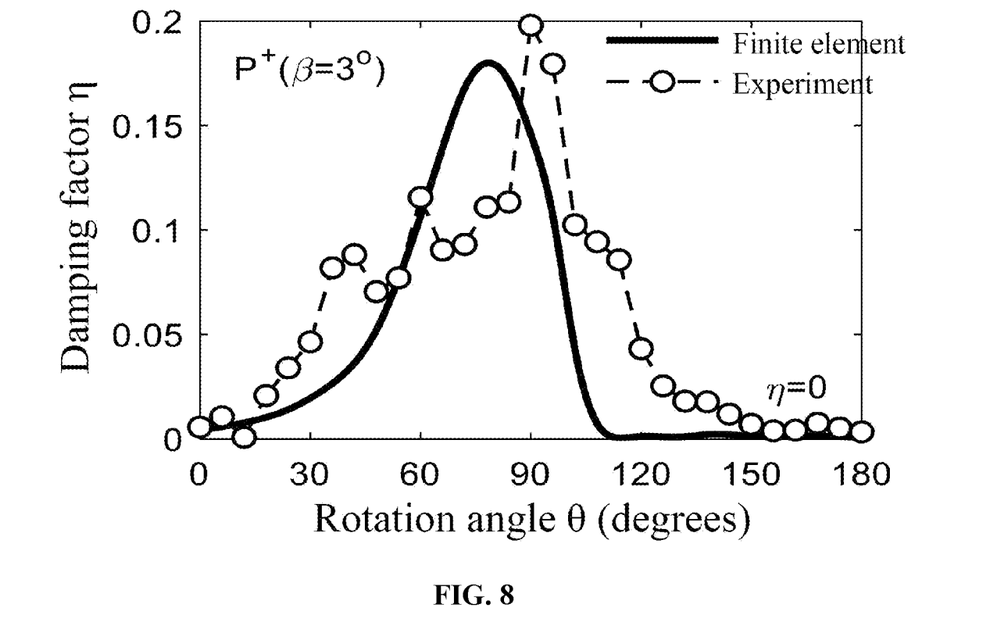
FIG. 8 is a changing curve diagram of a damping parameter η along with change of the rotation angle θ of the gear in preferred embodiments, where this diagram corresponds to the meshing mode and the angle difference labeled in FIG. 6.

The damping of the mechanical metamaterial is caused by slippage between gear teeth. The damping effect increases along with the increase of the Young modulus, thereby achieving the characteristics of high stiffness and high damping. According to the embodiment, based on the finite element simulation and experimental testing, the damping coefficient η can be adjusted within the range of 0 to 0.18 for the mechanical metamaterial with positive meshing polarity and 3-degree angle difference, as shown in FIG. 8.

Figure 9:
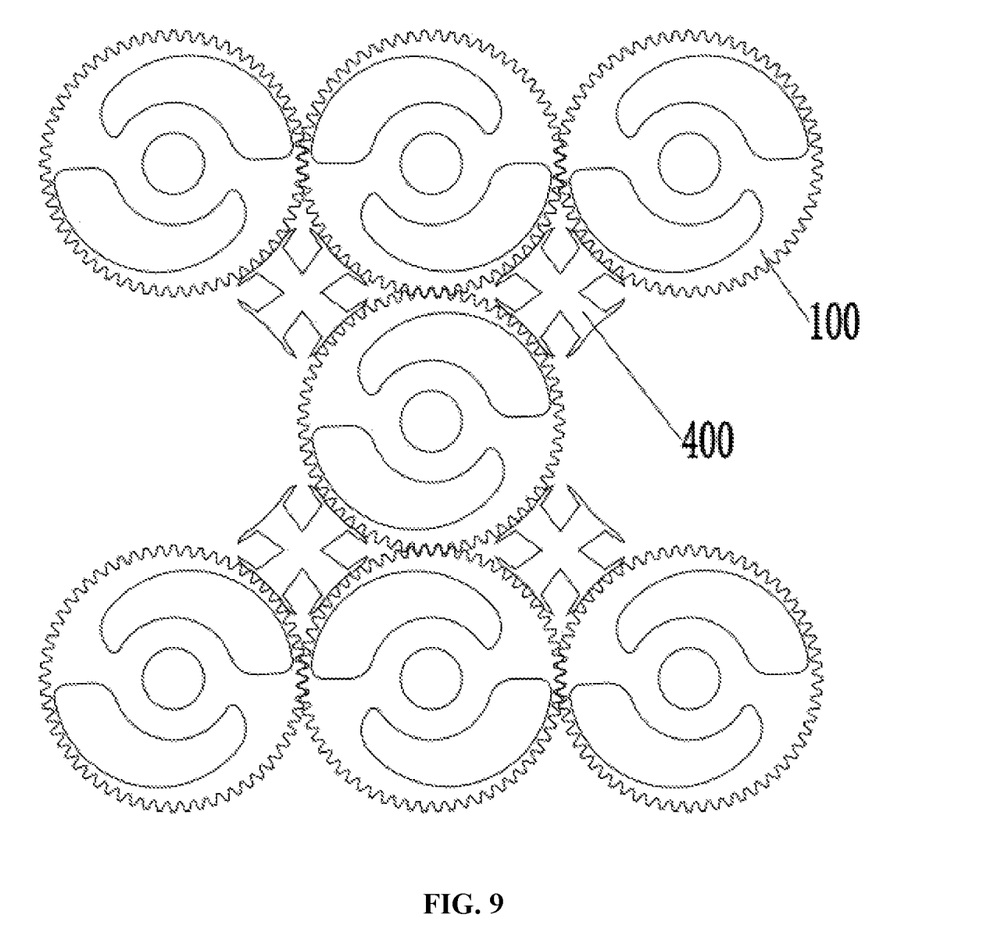
FIG. 9 is a structural schematic diagram of a gear-based mechanical metamaterial cell for adjusting and controlling the Young modulus parameter and the non-anisotropy parameter.
Figure 10:
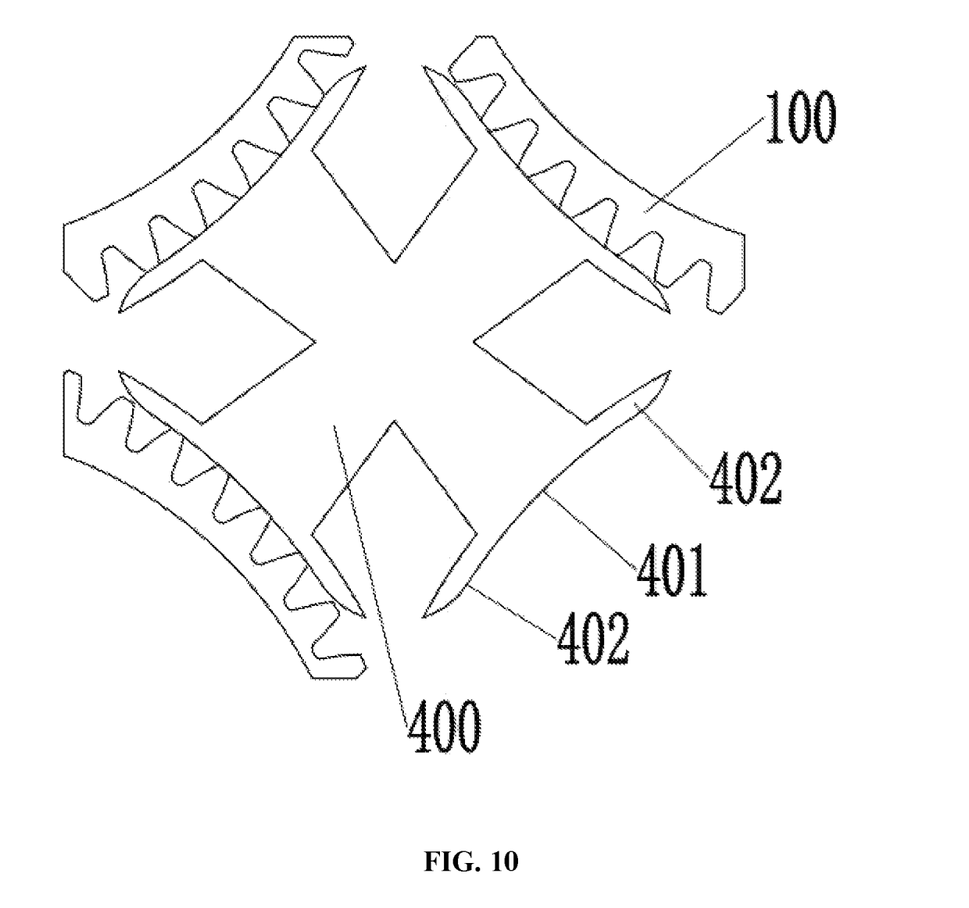
FIG. 10 is a structural diagram of an imbedded component in a part among every three gears in FIG. 9, where each imbedded component is in a cross-shaped shape.
Figure 11:
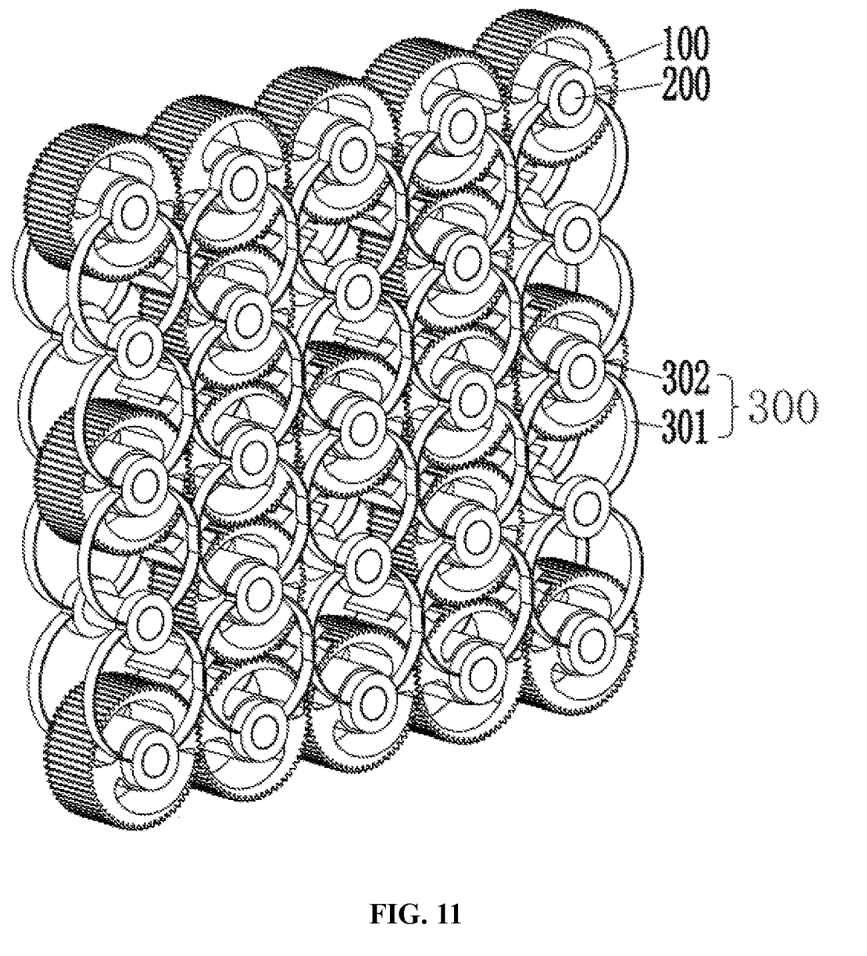
FIG. 11 is a structural diagram of a gear-based mechanical metamaterial composed of cells as shown in FIG. 9.

Although the above embodiment can also adjust and control the shear modulus, due to the existence of shear interlocking, the adjustment and control range of the shear modulus is small. In order to achieve a wide range of smooth adjustments to shear modulus and nonreciprocity, it is necessary to remove some gears and increase coupling of the gears in the diagonal direction. Therefore, the design of such gear-based mechanical metamaterial is provided by the present disclosure, as shown in FIG. 9 to FIG. 11, which includes a gear array, a frame and connecting shafts. The gear array is formed by periodically extending mechanical metamaterial cells along the x direction and the y direction. Each mechanical metamaterial cell is composed of seven gears which are meshed with one another. The seven gears are arranged into a 3 multiply 3 array. Two side sites of a middle row or a middle column are vacated one gear of the gears respectively to form a defect state, and interspaces formed by two adjacent gears among every three gears arranged diagonally of the seven gears is provided with respective imbedded components which are in conformal and conformally contact with the three gears. Preferably, the embedded component is a cross-shaped embedded component 400. Each of four end parts of the cross-shaped embedded component 400 is a concave arc 401 matched with an arc of a corresponding one of the seven gears. The concave arc 401 is in conformal conformally contact with the gear. The shear interlocking is eliminated by forming the gears to be in the defect state. So, the coupling of the gear array in the diagonal direction is increased through the cross-shaped embedded components, and shear stress is mainly borne by the gears on the diagonal line, so that continuous and smooth adjustment and control of the shear modulus can be achieved. Preferably, as shown in FIG. 10, two symmetrical elastic arms 402 extend outwards from each of the four end parts of the cross-shaped embedded component, and are configured for reducing the rotation resistance in the rotation process of the gears and preventing the gears from being clamped by the cross-shaped embedded component. Because the gear is not of an axisymmetric structure, the stiffness in the two diagonal directions is different. Preferably, when the shear modulus is adjusted and controlled, the meshing mode of all gear is positive, and the meshing angle difference β is predetermined according to the required adjustment and control range. In order to increase the adjustment and control range, preferably, β is predetermined to be 3 degrees in the embodiment.

According to the design, the stiffness provided by the gears in the two diagonal directions is denoted by following formulations.

$$K_{d1}(\theta)=K_p(\theta-45°)k_{cr}/2[K_p(\theta-45°)+k_{cr}]$$

$$K_{d2}(\theta)=K_p(\theta+45°)k_{cr}/2[K_p(\theta+45°)+k_{cr}]$$

Where, $k_{cr}$ is the stiffness of the cross-shaped component in the diagonal direction. Thus, the shear modulus in the positive direction is denoted by $G_g^+(\theta)=K_{d1}(\theta)/2B$ and the shear modulus in the negative direction is denoted by $G_g^-(\theta)=K_{d2}(\theta)/2B$. Therefore, the 90-degree phase difference between the forward shear modulus and the backward shear modulus is denoted by $G_g^+(\theta)=G_g^-(\theta-90°)$.

According to the theories, changing the rotation angle θ can realize the continuous and smooth adjustment of the forward shear modulus $G_g^+(\theta)$ and the backward shear modulus $G_g^-(\theta)$.

The non-reciprocal quantity is defined as the ratio $G_g^+(\theta)/G_g^-(\theta)$. Due to the phase difference relation $G_g^+(\theta)=G_g^-(\theta-90°)$, the gear-based mechanical metamaterial for adjusting and controlling the shear modulus has a non-reciprocal shear deformation behavior, that is, shear deformation depends on the direction of applied shear stress, and the non-reciprocal quantity can be synchronously and smoothly adjusted and controlled.

Figure 12:
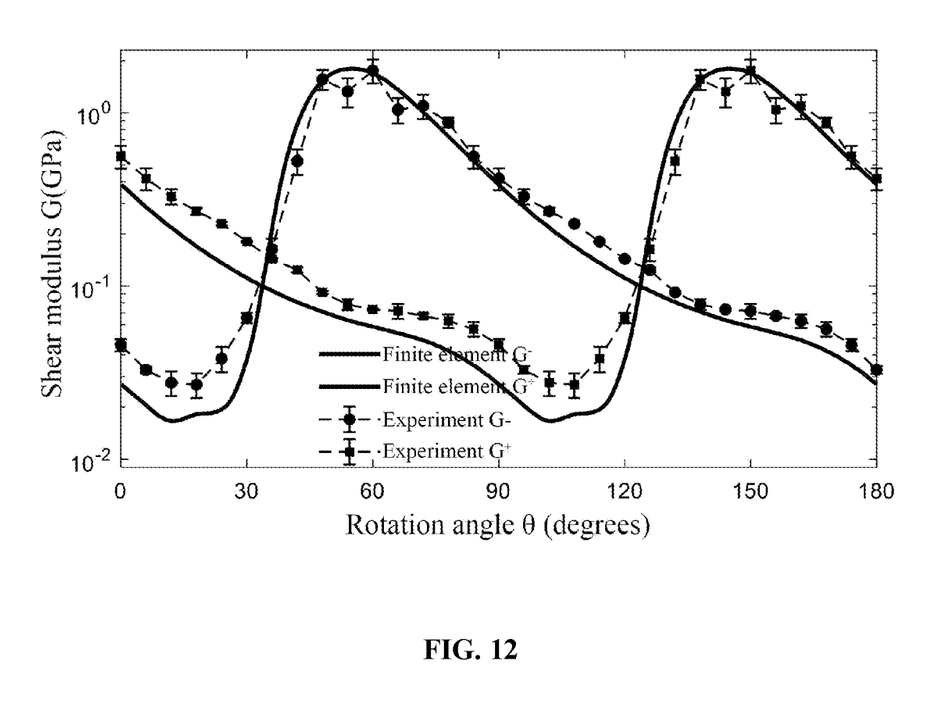
FIG. 12 is a changing curve of the shear modulus G along with change of the rotation angle θ of the gear in preferred embodiments; where the labels $G^+$ and $G^-$ indicate shear modulus obtained when application directions of shear stress τ are a positive direction and a negative direction respectively.

Finite element simulation and theoretical testing for shear modulus control characteristics are completed by the embodiment, and the result is shown in FIG. 12. The shear modulus in the embodiment is smoothly and continuously adjusted by 107 times.

The above are only the embodiments of the present disclosure and not intended to limit the protection scope of the present disclosure, and any equivalent transformations based on the specification and the drawings of the present disclosure, which is directly or indirectly applied in other related technical fields, shall similarly fall within the scope of patent protection of the present disclosure.

What is claimed is:

1. A gear-based mechanical metamaterial with continuously adjustable elastic parameters in a range, comprising: a gear array, a frame and connecting shafts,
wherein the gear array is formed by periodically extending mechanical metamaterial cells along an x direction and a y direction; each of the mechanical metamaterial cells is formed by arranging a plurality of gears, and adjacent gears of the plurality of gears are meshed with each other; each of the plurality of gears comprising a center hole and two centrosymmetric irregularly-shaped holes, and a thickness of an elastic arm between each of the two centrosymmetric irregularly-shaped holes and an outer wall of a corresponding one of the plurality of gears is uniformly increased or decreased; and each of the connecting shafts is arranged in a center hole of a corresponding one of the plurality of gears, and the gear array is connected to the frame through the connecting shafts.

2. The gear-based mechanical metamaterial with continuously adjustable elastic parameters in a range according to claim 1, wherein a meshing mode of every two adjacent gears of the plurality of gears comprises a positive-polarity meshing mode and a negative-polarity meshing mode; the positive-polarity meshing mode is such that the thickness of the elastic arm, which is at a meshing point of the every two adjacent gears, of one of the every two adjacent gears is gradually increased, and the thicknesses of the elastic arm, which is at the meshing point of the every two adjacent gears, of another one of the every two adjacent gears is gradually decreased; and the negative-polarity meshing mode is such that the thicknesses of the elastic arm of the one of the every two adjacent gears and the thickness of the elastic arm of the other one of the every two adjacent gears are simultaneously increased or decreased.

3. The gear-based mechanical metamaterial with continuously adjustable elastic parameters in a range according to claim 1, wherein the two centrosymmetric irregularly-shaped holes in each of the plurality of gears are spaced apart through elastic arm beams, which are on a same horizontal line, of the corresponding one of the plurality of gears; an angle difference is between the elastic arm beams of one of the every two adjacent gears which are meshed with each other and the elastic arm beams of another one of the every two adjacent gears; and the angle difference varies from 0 degree to 180 degrees.

4. The gear-based mechanical metamaterial with continuously adjustable elastic parameters in a range according to claim 1, wherein the stiffness of the frame is smaller than minimum stiffness formed by meshing the plurality of gears.

5. The gear-based mechanical metamaterial with continuously adjustable elastic parameters in a range according to claim 1, wherein the frame is an elastic frame which is formed by periodically extending thin-wall circular rings, and a thick-wall circular ring with a through hole is arranged at a connecting point of every two adjacent thin-wall circular rings of the thin-wall circular rings; and the through hole of the thick-wall circular ring is sleeved on a corresponding one of the connecting shafts, and the thick-wall circular ring is connected with a respective one of the plurality of gears through the corresponding one of the connecting shafts.

6. The gear-based mechanical metamaterial with continuously adjustable elastic parameters in a range according to claim 1, wherein each of the mechanical metamaterial cells comprises four gears meshed with one another, and the four gears are arranged into a 2 multiply 2 array.

7. The gear-based mechanical metamaterial with continuously adjustable elastic parameters in a range according to claim 6, wherein the every two adjacent gears are connected in the positive-polarity meshing mode or the negative-polarity meshing mode, and every two gears spaced apart by one gear have same installation angles, same installation front faces and same installation back faces.

8. The gear-based mechanical metamaterial with continuously adjustable elastic parameters in a range according to claim 1, wherein each of the mechanical metamaterial cells comprises seven gears which are meshed with one another, the seven gears are arranged into a 3 multiply 3 array, two side sites of a middle row or a middle column are vacated one gear of the gears respectively to form a defect state, and interspaces formed by two adjacent gears among every three gears arranged diagonally of the seven gears is provided with respective imbedded components which are in conformal and conformally contact with the three gears.

9. The gear-based mechanical metamaterial with continuously adjustable elastic parameters in a range according to claim 8, wherein each of the imbedded components is a cross-shaped imbedded component, and each of four end parts of the cross-shaped imbedded component is a concave arc matched with an arc of a corresponding one of the seven gears; and two symmetrical elastic arms extend outwards from each of the four end parts of the cross-shaped imbedded component.

10. The gear-based mechanical metamaterial with continuously adjustable elastic parameters in a range according to claim 8, wherein every two adjacent gears of the seven gears are meshed in the negative-polarity meshing mode.

11. The gear-based mechanical metamaterial with continuously adjustable elastic parameters in a range according to claim 2, wherein each of the mechanical metamaterial cells comprises four gears meshed with one another, and the four gears are arranged into a 2 multiply 2 array.

12. The gear-based mechanical metamaterial with continuously adjustable elastic parameters in a range according to claim 3, wherein each of the mechanical metamaterial cells comprises four gears meshed with one another, and the four gears are arranged into a 2 multiply 2 array.

13. The gear-based mechanical metamaterial with continuously adjustable elastic parameters in a range according to claim 4, wherein each of the mechanical metamaterial cells comprises four gears meshed with one another, and the four gears are arranged into a 2 multiply 2 array.

14. The gear-based mechanical metamaterial with continuously adjustable elastic parameters in a range according to claim 5, wherein each of the mechanical metamaterial cells comprises four gears meshed with one another, and the four gears are arranged into a 2 multiply 2 array.

15. The gear-based mechanical metamaterial with continuously adjustable elastic parameters in a range according to claim 2, wherein each of the mechanical metamaterial cells comprises seven gears which are meshed with one another, the seven gears are arranged into a 3 multiply 3 array, two side sites of a middle row or a middle column are vacated one gear of the gears respectively to form a defect state, and interspaces formed by two adjacent gears among every three gears arranged diagonally of the seven gears is provided with respective imbedded components which are in conformal and conformally contact with the three gears.

16. The gear-based mechanical metamaterial with continuously adjustable elastic parameters in a range according to claim 3, wherein each of the mechanical metamaterial cells comprises seven gears which are meshed with one another, the seven gears are arranged into a 3 multiply 3 array, two side sites of a middle row or a middle column are vacated one gear of the gears respectively to form a defect state, and interspaces formed by two adjacent gears among every three gears arranged diagonally of the seven gears is provided with respective imbedded components which are in conformal and conformally contact with the three gears.

17. The gear-based mechanical metamaterial with continuously adjustable elastic parameters in a range according to claim 4, wherein each of the mechanical metamaterial cells comprises seven gears which are meshed with one another, the seven gears are arranged into a 3 multiply 3 array, two side sites of a middle row or a middle column are vacated one gear of the gears respectively to form a defect state, and interspaces formed by two adjacent gears among every three gears arranged diagonally of the seven gears is provided with respective imbedded components which are in conformal and conformally contact with the three gears.

18. The gear-based mechanical metamaterial with continuously adjustable elastic parameters in a range according to claim 5, wherein each of the mechanical metamaterial cells comprises seven gears which are meshed with one another, the seven gears are arranged into a 3 multiply 3 array, two side sites of a middle row or a middle column are vacated one gear of the gears respectively to form a defect state, and interspaces formed by two adjacent gears among every three gears arranged diagonally of the seven gears is provided with respective imbedded components which are in conformal and conformally contact with the three gears.

* * * * *